Aug. 29, 1933.  W. J. DE WITT  1,924,982
FASTENER SETTING MACHINE
Filed June 10, 1932  2 Sheets-Sheet 1

Inventor
William J. DeWitt
by Roberts, Cushman & Woodbury
Attys.

Aug. 29, 1933.  W. J. DE WITT  1,924,982
FASTENER SETTING MACHINE
Filed June 10, 1932  2 Sheets-Sheet 2
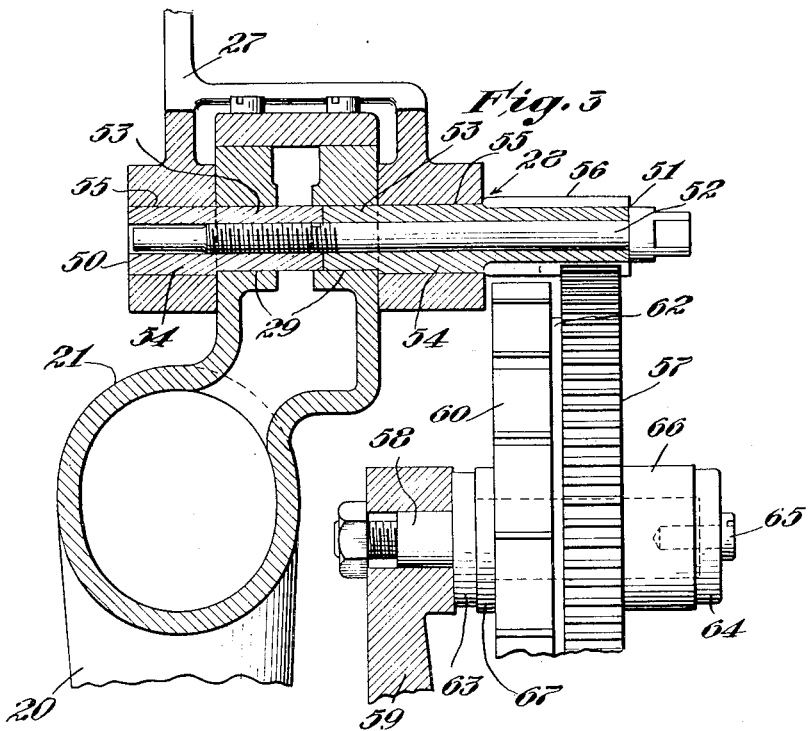
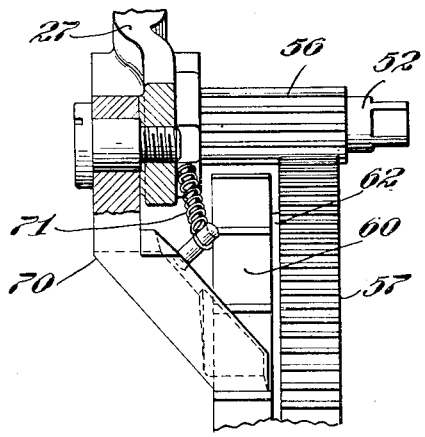
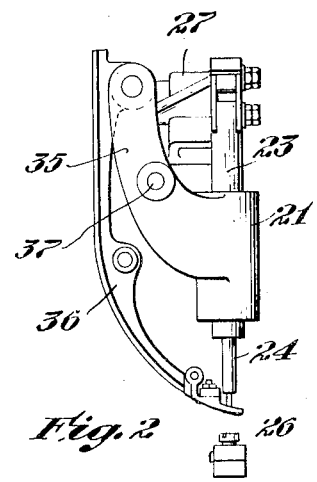
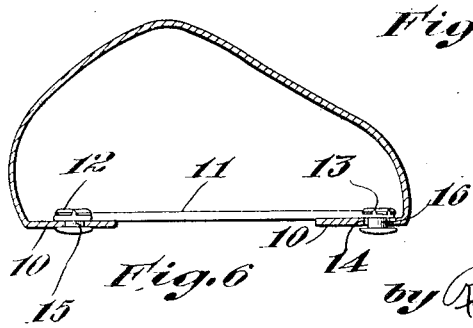
Inventor
William J. DeWitt
by Roberts Cushman & Woodbury
Att'ys.

Patented Aug. 29, 1933

1,924,982

UNITED STATES PATENT OFFICE 1,924,982

FASTENER SETTING MACHINE

William J. De Witt, Auburn, N. Y., assignor to Shoe Form Co., Inc., Auburn, N. Y., a corporation of New York Application June 10, 1932. Serial No. 616,380

20 Claims. (Cl. 218—15)

This invention relates to an improvement in a fastener-setting machine and more particularly, as herein illustrated and described, in a machine for setting tubular eyelets or rivets by upsetting and clenching their barrels.

In the manufacture of certain articles, for example, shoe forms, it is essential that certain fasteners be fixed in position in the material to which it is secured, and that other fasteners be freely movable therein. This requirement can be satisfied by making the upset fasteners of two lengths, the tubular barrels of one group of fasteners being shorter than the barrels of the other group. For purpose of ease in description the fasteners will be referred to as "long" and "short", it being understood, of course, that these terms are used in the relative sense only and that the difference in length is slight. While this can be done by using two machines suitably adjusted, this obviously requires an increase in investment in machines and retards the operations whether the separate machines are fed by the same or different operators.

The primary object of this invention is to provide a machine so constructed that it is capable of automatically setting fasteners so that the set fasteners have barrels of two differet lengths; more particularly a machine in which the setting operation produces an alternate sequence of long and short fasteners, such operation being entirely automatic and out of control of the operator who operates the machine in the usual way.

Other objects will appear from a consideration of the following description taken in connection with the drawings which form a part thereof, and in which Fig. 1 is a view in side elevation, partly broken away, of a machine embodying this invention;

Fig. 2 is a front view of the fastener setting tools of the machine;

Fig. 3 is an enlarged view, partly in section, of a portion of the mechanism of the machine, by which its upsetting operation is automatically controlled;

Fig. 4 is a similar view of another portion of such mechanism;

Fig. 6 is a sectional view taken along the line 6—6 of Fig. 5.

Figures 1, 5:
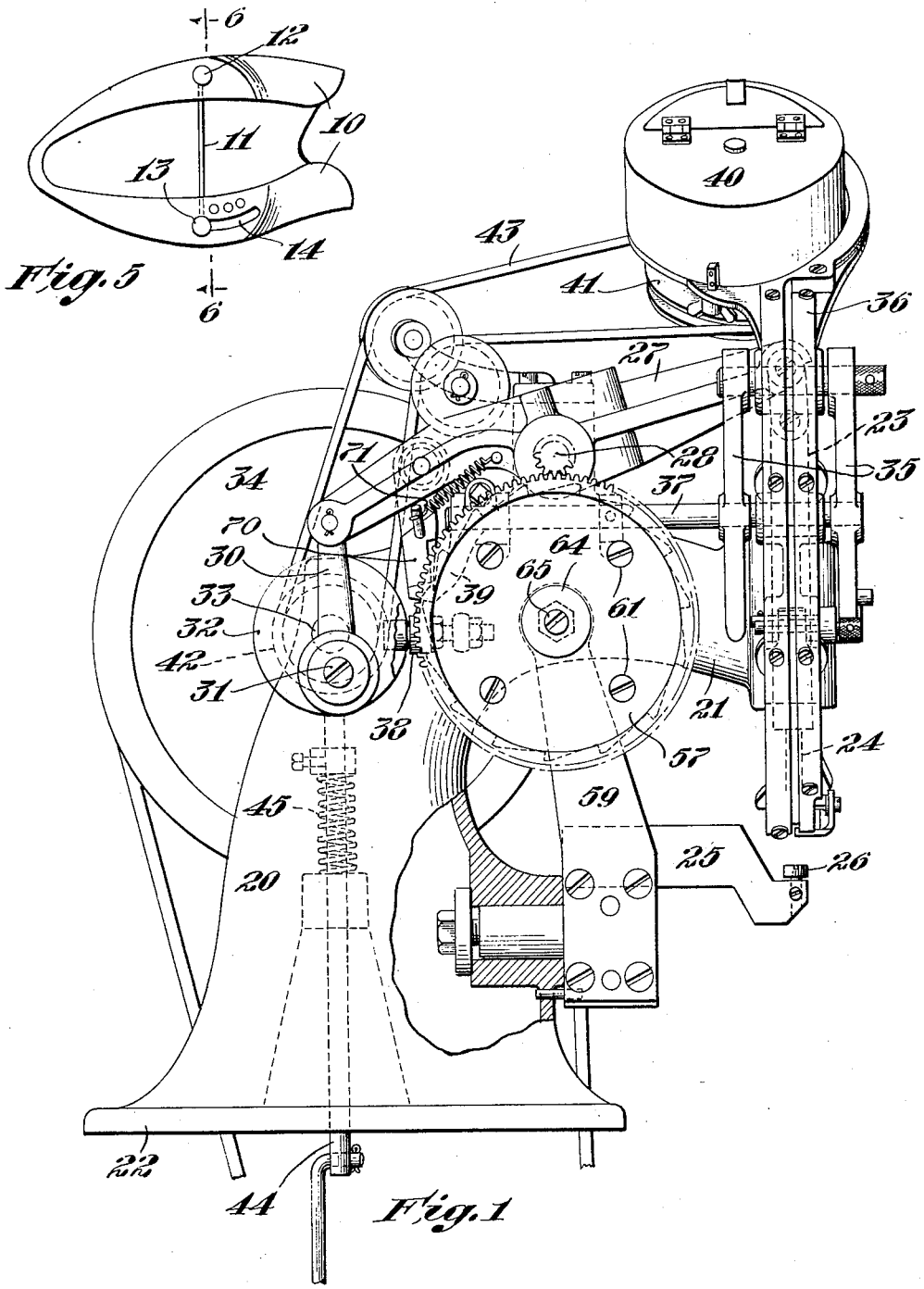
Fig. 5 is an illustration of a portion of a shoe form provided with long and short fasteners which may be upset by a machine embodying this invention.

In the manufacture of shoe forms, for example, the ball flanges 10 thereof are connected by a crossbrace 11 secured at its ends to the flanges by rivets 12 and 13. The rivet 12 is passed through a loop in the crossbrace and a hole in the flange and is of sufficient length to permit the crossbrace to pivot on the rivet barrel. The rivet 13, however, must be longer, since it not only permits the crossbrace to pivot but also must be reciprocable in a slot 14 in the flange. Hence the barrel 15 of the set rivet 12 need not be as long as the barrel 16 of the set rivet 13 and the rivets may be distinguished by the terms "short" and "long" respectively.

Various machines may be adapted to carry out this invention but, for the purpose of illustration, I have elected to show a reorganization of the fastener setting machine disclosed in the patent to Gookin No. 1,823,894, dated September 22, 1931. The machine comprises a frame 20 preferably hollow and provided with an overhanging arm 21 and a base 22 by which it is secured to a suitable support (not shown). Mounted for reciprocation in the arm 21 is a plunger 23 provided with a fastener-setting tool 24. Projecting from the frame 20 is a horn 25 on which is supported a clenching tool or die 26 which coacts with the tool 24 to set the fasteners in the well known way.

The plunger 23 is reciprocated by a lever 27 fulcrumed intermediate its length upon a pin 28 carried by bearings 29 in the arm 21. A link 30 connects one end of the lever 27 to a wrist pin 31 fixed upon and carried by a cam member 32. The member 32 is fixed upon a shaft 33 driven from any suitable source of power by a pulley 34. Pivotally supported on ears 35 projecting from the arm 21 is a raceway 36 by which fasteners are presented to the upsetting tools 24 and 26. The raceway 36 is oscillated by a rock shaft 37 supported in bearings on the arm 21 and actuated by a cam roll 38 mounted on a lever 39 and in engagement with the cam member 32. Fasteners are supplied to the raceway 36 by feeding mechanism of a well known type comprising a hopper 40, a pulley 41 by which a brush (not shown) in the hopper is rotated, a pulley 42 on the shaft 33, and a belt 43. A clutch (not shown), mounted upon the shaft 33, is controlled by a rod 44 so that when the rod is depressed by the operator, the pulley 34 is coupled to the shaft 33 and when the rod is raised by a spring 45 the pulley is uncoupled from the shaft.

The fulcrum pair 28 (see Fig. 2) is made of two tubular sections 50 and 51 held in abutting relation by a rod 52 in threaded engagement with the section 50. The abutting ends of the sections are held against relative rotation by any suitable means as, for example, the tongue and groove shown in dotted lines. Each section has a cylindrical portion 53 concentric with respect to the rod 52 and a cylindrical portion 54 eccentric with respect to the rod. The portions 53 are received by the bearings 29 in the arm 21 while the portions 54 are received by bearings 55 in the lever 27. The section 51 also has a toothed cylindrical portion 56 with which mesh the teeth of a gear wheel 57 rotatably supported on an axle 58 secured to a post 59 carried by the horn 25. Rotatably supported on the axle 58 is also a ratchet wheel 60 secured to the wheel 57 by pins 61. As shown in Fig. 2 the wheel 57 is provided with a flange 62 so that the periphery of the wheel 60 is held out of contact with the wheel 57. The wheels 57 and 60 thus move freely as a unit about the axle 58 in the space between a shoulder 63 on the axle and a washer 64 secured by a screw 65 to the end of the axle. The outer faces of the wheels 57 and 60 are provided with integral collars or flanges 66 and 67 respectively. The wheels 57 and 60 are rotated step by step by a pawl 70 carried by the lever 27 and held by a spring 71 in contact with the periphery of the wheel 57.

When the rod 44 is depressed to couple the pulley 34 to the shaft 33 the lever 27 causes the tool 24 to move toward and from the tool 26 and thus upset a fastener in the work. As the lever 27 returns to the Fig. 1 position the pawl 70 thereon engages and rotates the wheel 60. Since the wheel 60 is secured to the wheel 57, the latter is thus actuated to rotate the pin 28 and shift the fulcrum of the lever so that the distance between the tools 24 and 26 is varied. The teeth of the wheel 57 and the section 56 are so spaced that the pin is turned through 180° so that the fulcrum of the lever 27 is raised appreciably. The following actuation of the lever 27 will obviously not bring the tool 24 as near the tool 26 as in the preceding actuation and as a result the tubular barrel of the fastener then set will be longer than that of the fastener just previously set. As the lever 27 returns to the Fig. 1 position, the pin 28 is again rotated through 180° by the operation of the pawl 70 and wheels 60 and 57 so that it resumes the position shown in Fig. 2.

With the arrangement just described the machine sets alternately short and long fasteners or when setting the rivets in the form illustrated in Figs. 5 and 6, the rivets 12 and 13. However, by making the necessary changes obvious to any mechanic, the sequence of operations can be changed as required to one for setting two short rivets and two long rivets, or any other sequence desired.

While one embodiment of this invention has been shown and described, I am not limited thereto, since other embodiments may be made without departing from the spirit and scope of this invention as set forth in the following claims.

I claim:

1. A fastener setting machine comprising setting tools arranged to apply upsetting and clenching pressure against the fasteners, and means independent of the material treated for automatically varying the distance between said tools when the setting operation is performed.

2. A fastener setting machine comprising setting tools arranged to apply upsetting and clenching pressure against the fasteners, means for moving one of said tools toward and away from the other tool to set a fastener at each operation, and means independent of the material treated for automatically varying the distance between the tools when the setting operation is performed.

3. A fastener setting machine comprising setting tools arranged to apply upsetting and clenching pressure against the fasteners, means for moving one of said tools toward and away from the other tool to set a fastener at each operation, and means actuated automatically by said moving means independent of the material treated for varying the distance between the tools when the setting operation is performed.

4. A fastener setting machine comprising setting tools arranged to apply upsetting and clenching pressure against the fasteners, a lever by which one of said tools is moved toward and away from the other tool to set a fastener at each operation, and means operable automatically independent of the material treated for shifting the fulcrum of said lever to vary the distance between the tools when the setting operation is performed.

5. A fastener setting machine comprising setting tools arranged to apply upsetting and clenching pressure against the fasteners, a lever by which one of said tools is moved toward and away from the other tool to set a fastener at each operation, and means actuated by said lever independent of the material treated for shifting the fulcrum of said lever to vary the distance between the tools when the setting operation is performed.

6. A fastener setting machine comprising setting tools arranged to apply upsetting and clenching pressure against the fasteners, a lever by which one of said tools is moved toward and away from the other tool to set a fastener at each operation, a pin on which said lever is fulcrumed and means operable automatically independent of the material treated for moving said pin to shift the fulcrum of said lever to vary the distance between the tools when the setting operation is performed.

7. A fastener setting machine comprising setting tools arranged to apply upsetting and clenching pressure against the fasteners, a lever by which one of said tools is moved toward and away from the other tool to set a fastener at each operation, a pin on which said lever is fulcrumed, and means actuated by said lever independent of the material treated for moving said pin to shift the fulcrum of said lever to vary the distance between the tools when the setting operation is performed.

8. A fastener setting machine comprising setting tools arranged to apply upsetting and clenching pressure against the fasteners, a lever by which one of said tools is moved toward and away from the other tool to set a fastener at each operation, a pin on which said lever is fulcrumed and having an eccentric cylindrical surface, and means for rotating said pin to shift the fulcrum of said lever to vary the distance between the tools when the setting operation is performed.

9. A fastener setting machine comprising setting tools arranged to apply upsetting and clenching pressure against the fasteners, a lever by which one of said tools is moved toward and away from the other tool to set a fastener at each operation, a pin on which said lever is fulcrumed and having an eccentric cylindrical surface, and means actuated by said lever for rotating said pin to shift the fulcrum of said lever to vary the distance between the tools when the setting operation is performed.

10. A fastener setting machine comprising setting tools arranged to apply upsetting and clenching pressure against the fasteners, a lever by which one of said tools is moved toward and away from the other tool to set a fastener at each operation, a pin on which said lever is fulcrumed, the cylindrical surface of the pin engaged by the lever being eccentric, and means for rotating said pin to shift the fulcrum of said lever to vary the distance between the tools when the setting operation is performed.

11. A fastener setting machine comprising setting tools arranged to apply upsetting and clenching pressure against the fasteners, a lever by which one of said tools is moved toward and away from the other tool to set a fastener at each operation, a pin on which said lever is fulcrumed, the cylindrical surface of the pin engaged by the lever being eccentric, and means actuated by said lever for rotating said pin to shift the fulcrum of said lever to vary the distance between the tools when the setting operation is performed.

12. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, mechanism on the frame for moving said pin and shifting the fulcrum of the lever, and means operable in sequence with the movement of said tool away from the other tool for actuating said mechanism.

13. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, mechanism on the frame for moving said pin and shifting the fulcrum of the lever, and means operable by said lever in sequence with the movement of said tool away from the other tool for actuating said mechanism.

14. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, said pin being rotatable and having an eccentric cylindrical surface engaged by the lever, mechanism on the frame for rotating said pin and thereby shifting the fulcrum of the lever, and means operable in sequence with the fastener setting operation of said tools for actuating said mechanism.

15. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, said pin being rotatable and having an eccentric cylindrical surface engaged by the lever, mechanism on the frame for rotating said pin and thereby shifting the fulcrum of the lever, and means operable by said lever in sequence with the fastener setting operation of said tools for actuating said mechanism, whereby a predetermined sequence of long and short fasteners is set.

16. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, said pin being rotatable and having an eccentric cylindrical surface engaged by the lever and a toothed cylindrical portion, a gear wheel on said frame in mesh with said toothed portion, and means operable in sequence with the fastener setting operation of said tools for imparting a rotary movement through said wheel to said pin.

17. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, said pin being rotatable and having an eccentric cylindrical surface engaged by the lever and a toothed cylindrical portion, a gear wheel on said frame in mesh with said toothed portion, and means operable by said lever in sequence with the fastener setting operation of said tools for imparting a rotary movement through said wheel to said pin, whereby a predetermined sequence of long and short fasteners is set.

18. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, said pin being rotatable and having an eccentric cylindrical surface engaged by the lever and a toothed cylindrical portion, a gear wheel on said frame in mesh with said toothed portion, and means, including a pawl, carried by said lever, operable in sequence with the fastener setting operation of said tools for imparting a rotary movement through said wheel to said pin, whereby a predetermined sequence of long and short fasteners is set.

19. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, said pin being rotatable and having an eccentric cylindrical surface engaged by the lever and a toothed cylindrical portion, a gear wheel on said frame in mesh with said toothed portion, and means, including a ratchet wheel, operable in sequence with the fastener setting operation of said tools for imparting a rotary movement through said wheel to said pin.

20. A fastener setting machine comprising a frame, setting tools carried thereby and arranged to apply upsetting and clenching pressure against the fasteners, a lever by which one of said tools is moved toward and away from the other tool to set a fastener at each operation, a pin carried by said frame on which said lever is fulcrumed, said pin being rotatable and having an eccentric cylindrical surface engaged by the lever and a toothed cylindrical portion, a gear wheel on said frame in mesh with said toothed portion, and means, including a ratchet wheel fixed to said gear wheel and a pawl carried by said lever, operable in sequence with the fastener setting operation of said tools for imparting a rotary movement through said wheel to said pin, whereby a predetermined sequence of long and short fasteners is set.

WILLIAM J. DE WITT.